United States Patent
Von-Lambert

[11] Patent Number: 5,491,990
[45] Date of Patent: Feb. 20, 1996

[54] STEERING WHEEL DISABLING DEVICE

[76] Inventor: Shone M. Von-Lambert, P.O. Box 470242, Brooklyn, N.Y. 11247

[21] Appl. No.: 230,731

[22] Filed: Apr. 21, 1994

[51] Int. Cl.⁶ .................................................. B60R 25/02
[52] U.S. Cl. .................. 70/209; 70/212; 70/226
[58] Field of Search ............................ 70/209, 211, 212, 70/225, 226, 237, 238; 180/287

[56] References Cited

U.S. PATENT DOCUMENTS

| | | | |
|---|---|---|---|
| 1,531,062 | 3/1925 | Barravecchia | 70/202 |
| 2,716,336 | 8/1955 | Ross | 70/212 |
| 3,190,090 | 6/1965 | Zaidener | 70/212 |
| 3,462,982 | 8/1969 | Moore | 70/209 |
| 4,304,110 | 12/1981 | Fain | 70/209 |
| 4,848,110 | 7/1989 | Kuo | 70/38 C |
| 4,913,265 | 4/1990 | Richards | 70/226 |
| 5,031,428 | 7/1991 | Jan et al. | 70/209 |
| 5,107,691 | 4/1992 | Wu | 70/209 |
| 5,113,672 | 5/1992 | Wang | 70/209 |
| 5,157,951 | 10/1992 | Chen et al. | 70/209 |
| 5,333,478 | 8/1994 | Chuang | 70/209 |

FOREIGN PATENT DOCUMENTS

| | | | |
|---|---|---|---|
| 2039840 | 8/1980 | United Kingdom | 70/209 |

*Primary Examiner*—Darnell M. Boucher
*Attorney, Agent, or Firm*—Richard L. Miller

[57] ABSTRACT

A disabling device is designed for a steering wheel of a motor vehicle, which consists of an elongated rod. Components which utilize conventional padlocks are provided for locking the elongated rod onto the steering wheel, to prevent a would-be thief from turning the steering wheel when attempting to steal the motor vehicle. Three embodiments of the instant invention foil a thief because they are just to large and bulky to permit the steering wheel to be operated when locked in place, while an alternative fourth embodiment provides security by actually disabling both the steering wheel and brake pedal simultaneously.

8 Claims, 2 Drawing Sheets

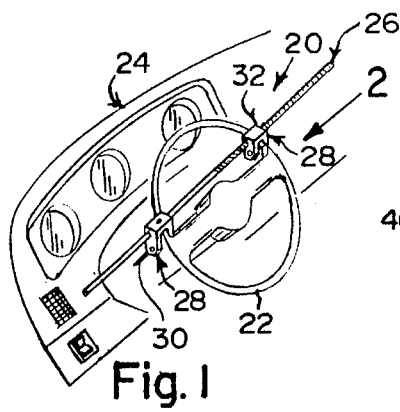
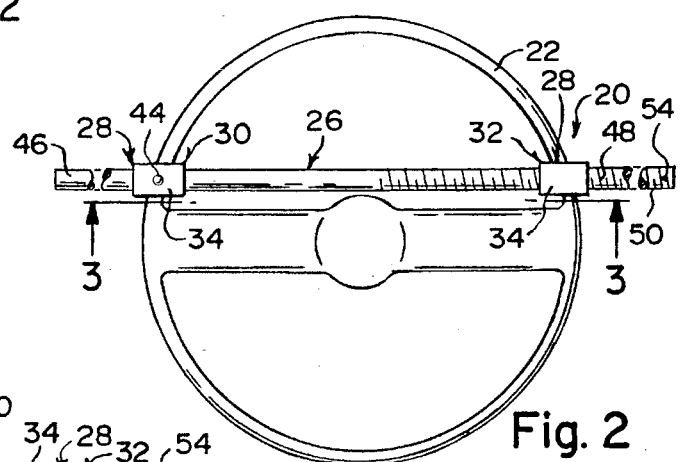
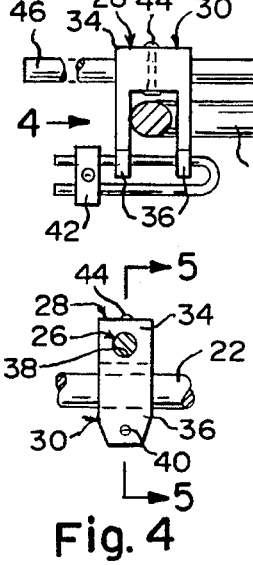
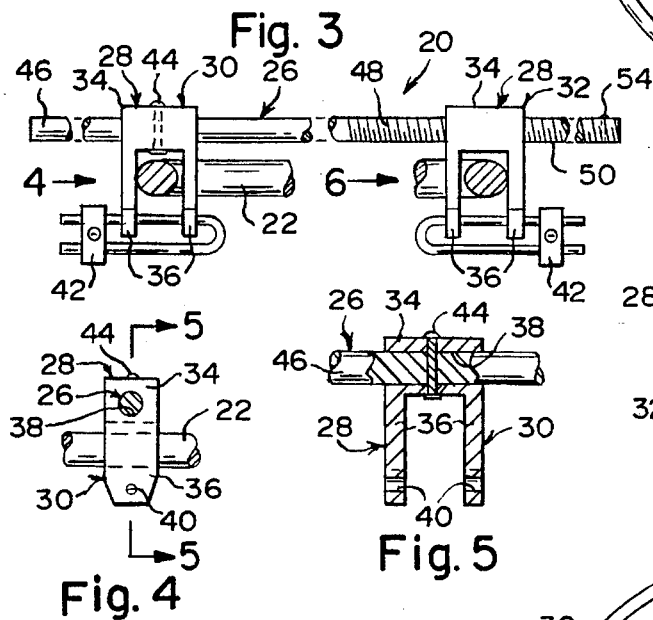
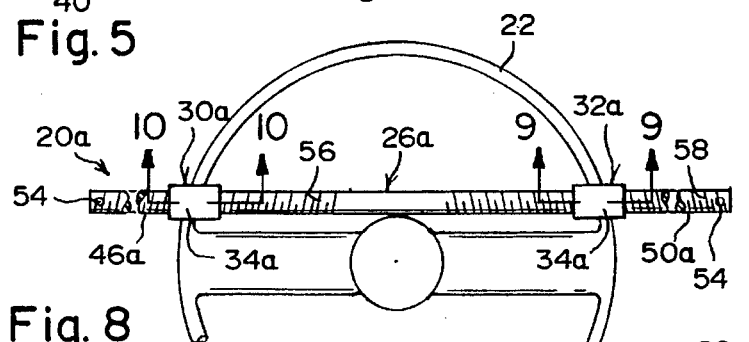
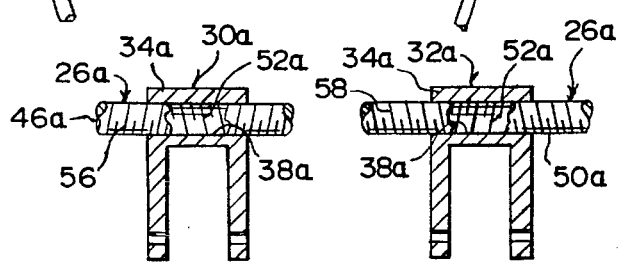

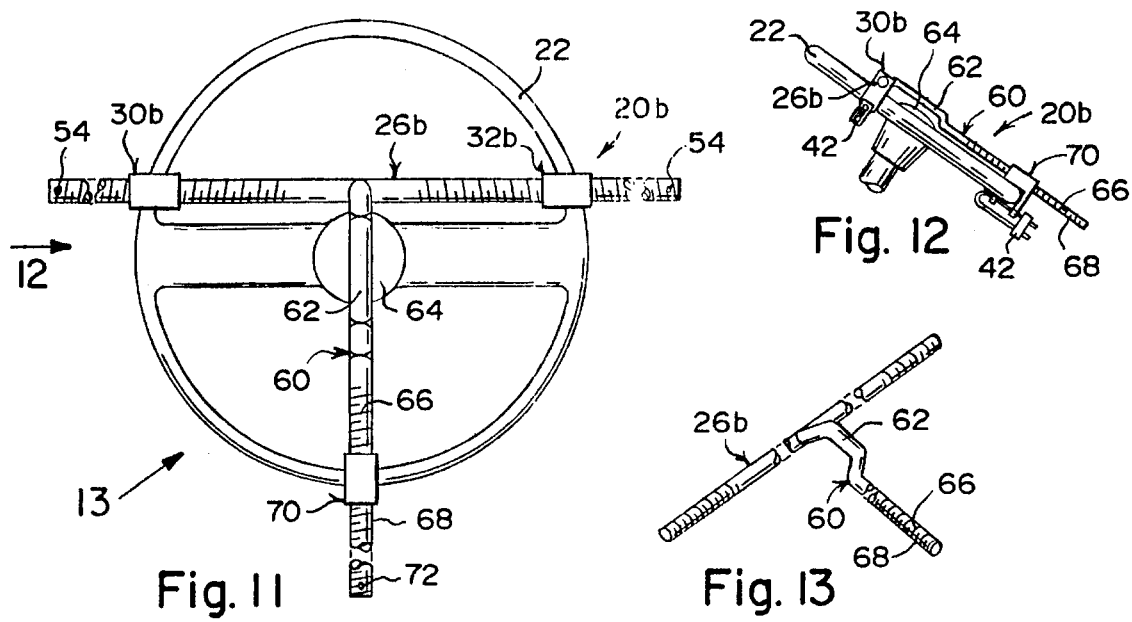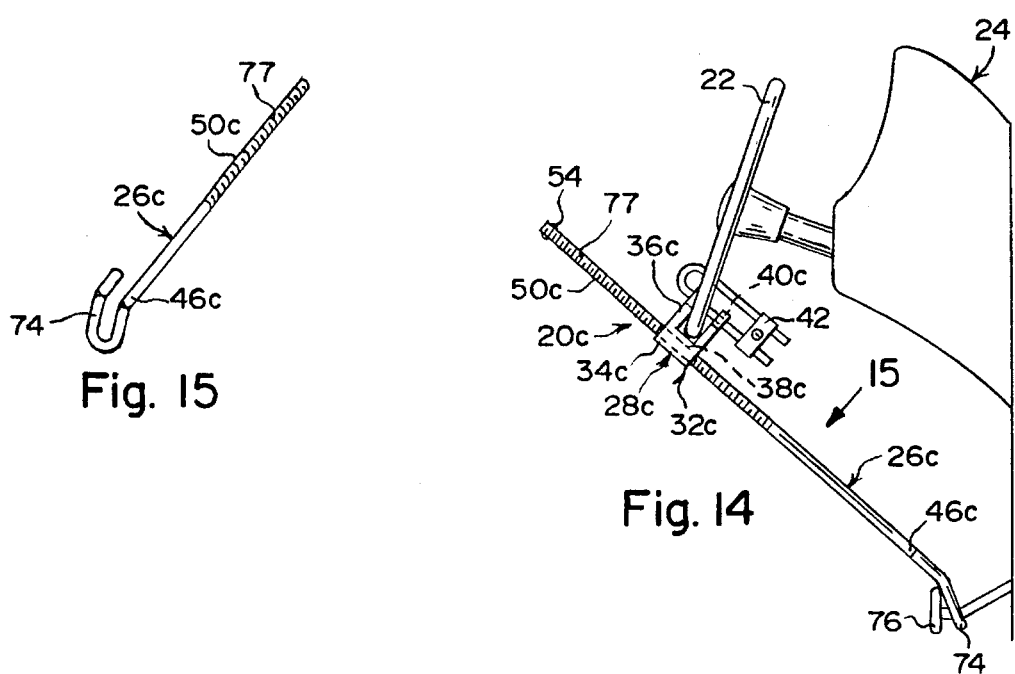

5,491,990

STEERING WHEEL DISABLING DEVICE

BACKGROUND OF THE INVENTION

The instant invention relates generally to car lock devices and more specifically it relates to a steering wheel disabling device.

Numerous car lock devices have been provided in prior art that are adapted to be attached to steering wheels to prevent the unauthorized driving of automobiles. For example, U.S. Pat. Nos. 4,848,110 to Kuo; 5,031,428 to Jan et al.; 5,107,691 to Wu and 5,113,672 to Wang all are illustrative of such prior art.

While these units may be suitable for the particular purpose to which they address, they would not be as suitable for the purposes of the present invention as heretofore described.

SUMMARY OF THE INVENTION

A primary object of the present invention is to provide a steering wheel disabling device that will overcome the shortcomings of the prior art devices.

Another object is to provide a steering wheel disabling device that is locked onto a steering wheel in a motor vehicle, to prevent a thief from turning the steering wheel when attempting to steal the motor vehicle.

An additional object is to provide a steering wheel disabling device that is locked between a steering wheel and a brake pedal in a motor vehicle, whereby a thief will not be able to operate both the steering wheel and the brake pedal, when the thief is trying to steal the motor vehicle.

A further object is to provide a steering wheel disabling device that is simple and easy to use.

A still further object is to provide a steering wheel disabling device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a diagrammatic perspective view of a first embodiment of the instant invention in use;

FIG. 2 is an enlarged top view taken generally in the direction of arrow 2 in FIG. 1 of just the instant invention installed on a steering wheel;

FIG. 3 is an enlarged cross sectional view with parts broken away taken on line 3—3 of FIG. 2;

FIG. 4 is a side view taken in the direction of arrow 4 in FIG. 3 of the fixed bracket;

FIG. 5 is a cross sectional view taken on line 5—5 of FIG. 4;

FIG. 6 is a side view taken in the direction of arrow 6 in FIG. 3 of the adjustable bracket;

FIG. 7 is a cross sectional view taken on line 7—7 of FIG. 6;

FIG. 8 is a top view similar to FIG. 2, but of a second embodiment of the instant invention;

FIG. 9 is a cross sectional view taken on line 9—9 of FIG. 8;

FIG. 10 is a cross sectional view taken on line 10—10 of FIG. 8;

FIG. 11 is a top view similar to FIG. 2, but of a third embodiment of the instant invention;

FIG. 12 is a side view taken in the direction of arrow 12 in FIG. 11;

FIG. 13 is a diagrammatic perspective view with parts broken away taken generally in the direction of arrow 13 in FIG. 11;

FIG. 14 is a diagrammatic side view of a fourth embodiment of the instant invention showing this embodiment locking the steering wheel to the brake pedal; and FIG. 15 is a perspective view of the hook portion of the fourth embodiment.

DETAILED DESCRIPTION OF THE PREFERRED EMBODIMENTS

Turning now descriptively to the drawings, in which similar reference characters denote similar elements throughout the several views, FIGS. 1 through 7 illustrate a first embodiment of a disabling device 20 for a steering wheel 22 of a motor vehicle 24, which consists of an elongated rod 26. Components 28 are for locking the elongated rod 26 onto the steering wheel 22, to prevent a thief from turning the steering wheel 22 when attempting to steal the motor vehicle 24.

The locking components 28 are a pair of brackets 30, 32 spaced apart on the elongated rod 26. Each bracket 30, 32 can engage an opposite portion of the steering wheel 22, with opposite ends of the elongated rod 26 extending beyond the steering wheel 22.

Each bracket 30, 32 is U-shaped and includes a base 34 and two legs 36 extending from the base 34, to fit over one portion of the steering wheel 22. The base 34 has a bore 38 therethrough to receive the elongated rod 26, while the legs 36 have aligned apertures 40 therethrough to accept a padlock 42.

A rivet 44 extends transversely through the bore 38 in the base 34 of the first bracket 30 and a first segment 46 of the elongated rod 26. The first bracket 30 will be stationary with respect to the elongated rod 26. The elongated rod 26 has threads 48 on a second segment 50, opposite from the first segment 46. The second bracket 32 has threads 52 within the bore 38 in the base 34. The second bracket 32 can screw onto the threaded second segment 50 of the elongated rod 26 and be adjustable, so as to fit onto different sized steering wheels 22. A stop pin 54 extends transversely through an end of the threaded second segment 50 of the elongated rod 26, to prevent the second bracket 32 from unscrewing therefrom.

A second embodiment of the disabling device 20a, shown in FIGS. 8 through 10, further includes the elongated rod 26a having left hand threads 56 on a first segment 46a and right hand threads 58 on a second segment 50a. Each bracket 30a, 32a has threads 52a within the bore 38a in the base 34a. The first bracket 30a can screw onto the first segment 46a of the elongated rod 26a and be adjustable. The second bracket 32a can screw onto the second segment 50a of the elongated rod 26a and be adjustable, so as to fit onto different sized steering wheels 22 and allow the elongated rod 26a in one instance to shift to the left and in another instance to shift to the right. A pair of stop pins 54 are provided, with each extending transversely through one end of each segment 46a, 50a of the elongated rod 26a to prevent each bracket 30a, 32a from unscrewing therefrom.

This arrangement of having both left hand threads 56 and right hand threads 58 permits easy adjustment for fitting the device 20a on a steering wheel 22, but essentially prevents the elongated rod 26a from being rotated after the device is locked in place on the steering wheel 22.

A third embodiment of the disabling device 20a, shown in FIGS. 11 through 13, contains an extension rod 60 extending from the center of the elongated rod 26b to form a tee-shaped configuration. The extension rod 60 has a first segment 62 that is bent at the center of the elongated rod 26b to pass over a horn 64 in the steering wheel 22 and threads 66 on a second segment 68. A third bracket 70 is provided, that is identical to each of the pair of brackets 30b, 32b on the elongated rod 26b. The third bracket 70 can screw onto the threaded second segment 68 of the extension rod 60 and be adjustable, so as to fit onto different sized steering wheels 22. A third stop pin 72 is identical to each of the pair of stop pins 54 in the elongated rod 26b. The third stop pin 70 extends transversely through an end of the threaded second segment 68 of the extension rod 60, to prevent the third bracket 70 from unscrewing therefrom. This teeshaped configuration 26b although more bulky and more awkward to store than the first or second embodiments, 20 and 20a respectively, provides a higher degree of security because a would-be thief must cut the steering wheel in at least two places in order to steal a vehicle when this device is properly installed.

The fourth embodiment of the disabling device 20c is shown in FIGS. 14 and 15, wherein the locking components 28c consists of the elongated rod 26c having a bent hook 74 at a first segment 46c, to engage with a brake pedal 76 in the motor vehicle 24 and threads 76 on a second segment 50c. A U-shaped bracket 32c has a base 34c and two legs 36c extending from the base 34c to fit over one portion of the steering wheel 22. The base 34c has a threaded bore 38c therethrough to screw onto the threaded second segment 50c of the elongated rod 26c. The legs 36c have aligned apertures 40c therethrough to accept a padlock 42. A stop pin 54 extends transversely through an end of the threaded second segment 50c of the extension rod 26c, to prevent the bracket 32c from unscrewing therefrom. This fourth embodiment which has the advantages of being relatively easy to store and disabling both the steering wheel and brake pedal simultaneously, suffers from the disadvantage that a would-be thief need only cut the steering wheel in one place to defeat the device regardless of how it is installed.

OPERATION OF THE INVENTION

To use the disabling device 20, simply place the bracket 30 on the steering wheel 22 and adjust bracket 32 on the elongated rod 26 until it engages the steering wheel 22. The padlocks 42 can then be locked in place on the brackets 30 and 32.

To use the disabling device 20a, simply adjust the brackets 30a and 32a on the elongated rod 26a, so that the brackets 30 and 32a will engage the steering wheel 22. The padlocks 42 are then locked in place on the brackets 30a and 32a.

To use the disabling device 20b, simply adjust the brackets 30b and 32b on the elongated rod 26b and the bracket 70 on the extension rod 60. The brackets 30b, 32b and 70 will now engage the steering wheel 22. The padlocks 42 can be locked in place on the brackets 30b, 32b and 70.

To use the disabling device 20c, simply adjust the bracket 32b on the elongated rod 26c. Engage the bent hook 74 with the brake pedal 76 and the bracket 32b to the steering wheel 22. The padlock 42 is locked in place on the bracket 32b.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A disability device for a steering wheel of a motor vehicle, which comprises:

a) an elongated rod having first and second longitudinally spaced segments;

b) bracket means for locking said elongated rod onto the steering wheel, to prevent a thief from turning the steering wheel to steal the motor vehicle, including a pair of U-shaped brackets each including a base and two legs extending from said base to fit over one portion of the steering wheel, with said base having a bore therethrough to slidingly receive a respective segment of said elongated rod, said legs having aligned apertures therethrough to accept a padlock for locking the brackets spaced apart on said elongated rod with each said bracket engaged with an opposite portion of the steering wheel and with opposite ends of said elongated rod extending beyond the steering wheel;

c) an extension rod extending rigidly from the center of said elongated rod, to form a tee-shaped configuration, said extension rod having a first segment that is bent at the center of said elongated rod, to pass over a horn in the steering wheel and a second segment;

d) a third bracket substantially identical to each of said pair of brackets on said elongated rod, so that said third bracket slidingly receive said second segment of said extension rod and be adjustable so as to fit onto different sized steering wheels.

2. A disabling device according to claim 1 in which stop pins extend transversely through respective opposite ends of said elongated rod and a free end of said extension rod to prevent either bracket of said pair of brackets from unscrewing therefrom.

3. A disabling device for a steering wheel of a motor vehicle, which comprises:

a) an elongated rod having first and second longitudinally spaced segments with threads formed thereon;

b) bracket means for locking said elongated rod onto the steering wheel, to prevent a thief from turning the steering wheel to steal the motor vehicle, including a pair of U-shaped brackets each including a base and two legs extending from said base to fit over one portion of the steering wheel, with said base having a threaded bore therethrough to meshingly receive a respective segment of said elongated rod, said legs having aligned apertures therethrough to accept a padlock for locking the brackets spaced apart on said elongated rod with each said bracket engaged with an opposite portion of the steering wheel and with opposite ends of said elongated rod extending beyond the steering wheel;

c) an extension rod extending rigidly from the center of said elongated rod, to form a tee-shaped configuration, said extension rod having a first segment that is bent at the center of said elongated rod, to pass over a horn in the steering wheel and a threaded second segment;

d) a third bracket substantially identical to each of said pair of brackets on said elongated rod, so that said third bracket can screw onto said threaded second segment of said extension rod and be adjustable, so as to fit onto different sized steering wheels.

4. A disabling device according to claim 3 in which a stop pin extends transversely through a free end of said threaded second segment of said extension rod, to prevent said third bracket from unscrewing therefrom.

5. A disabling device according to claim 3, in which the threads on said first and second segments of said elongated rod are left and right handed, respectively.

6. A disabling device according to claim 4, in which the threads on said first and second segments of said elongated rod are left and right handed, respectively.

7. A disabling device according to claim 3 in which stop pins extend transversely through respective opposite ends of said elongated rod to prevent either bracket of said pair of brackets from unscrewing therefrom.

8. A disabling device according to claim 5 in which stop pins extend transversely through respective opposite ends of said elongated rod to prevent either bracket of said pair of brackets from unscrewing therefrom.

* * * * *